F. E. GLAZE.
BEET HARVESTER.
APPLICATION FILED MAY 8, 1915.

1,280,207.

Patented Oct. 1, 1918.
7 SHEETS—SHEET 5.

Fig. 11.

Witnesses
Otto E. Hoddick
John B. Oade

Inventor
Frederick E. Glaze.
By

Attorney

Fig. 12.

UNITED STATES PATENT OFFICE.

FREDERICK E. GLAZE, OF DENVER, COLORADO, ASSIGNOR OF ONE-HALF TO J. M. DENNING, OF DENVER, COLORADO.

BEET-HARVESTER.

1,280,207.  Specification of Letters Patent.  Patented Oct. 1, 1918.

Application filed May 8, 1915. Serial No. 26,732.

*To all whom it may concern:*

Be it known that I, FREDERICK E. GLAZE, a citizen of the United States, residing at the city and county of Denver and State of Colorado, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in harvesters more especially adapted for harvesting sugar beets, though of course the machine may be employed in connection with vegetables of any kind whose bodies are located beneath the surface of the ground and having tops extending above the ground, since all vegetables of this character must be handled when harvested, in a similar manner. Owing to the fact that machines of this class are more especially employed for use in harvesting sugar beets, this particular use will be considered in the description of the function and operation of the various features of the apparatus, though it must be understood that it may also be employed in connection with other similar vegetables.

My object is to provide a machine of this character which shall be adapted to uproot the beets, remove the tops, elevate both the tops and bodies, separate them from each other and deliver them to separate receptacles which may be opened from time to time by the person in charge of the machine, whereby the beets and tops are discharged in separate piles at the rear of the machine.

To be more specific, the machine includes gathering devices upon its forward extremity, for raising the tops or foliage from the ground, bringing them together and delivering them to the forward extremities of two relatively long coöperating worms or screws. The beets are uprooted during the top-gathering operation so that as soon as the worms or screws catch the tops, the beets and tops together are carried upwardly, the two worms rotating in opposite directions, whereby there is a tendency to draw the bodies of the beets upwardly between the two worms, but as the worms are so close together that the beet bodies cannot pass between them, the threads of the worms by acting on the tops, cause the beets and tops to travel upwardly together until the knives are reached which serve to remove the tops. As soon as this occurs, the beets drop downwardly into a chute and are carried to a rotary screen-inclosed casing equipped with means, as a spiral flange, for elevating the beets and discharging them into a receptacle at the rear of the machine. After the tops are severed from the beet bodies, the tops are carried farther upwardly by the worms and finally delivered to two toothed rollers or sleeves mounted on the worm shafts but rotated in reverse directions, whereby the tops are carried downwardly and delivered to a conveyer, whence they are discharged into a receptacle mounted at the rear extremity of the machine.

From this it will be observed that the main distinguishing feature of the machine consists in the relatively long worms which are upwardly inclined from the forward extremity of the machine and which serve to elevate both the beets and tops. The other features of the novelty coöperating with this main feature in order to completely perform the beet-harvesting function, will be described in detail and their several functions pointed out as this specification proceeds.

Having therefore briefly outlined my improved construction, I will proceed to describe the same in detail, reference being made to the accompanying drawing, in which is illustrated an embodiment thereof. In this drawing,—

The same reference characters indicate the same parts in all the views.

Let the numeral 5 designate the framework of the structure considered in its entirety and consisting mainly of two longitudinally disposed top side members 6 suitably spaced and connected in the rear by transverse beams or bars 7 and 8. This framework is supported by ground wheels 9 made fast on a main axle 10 located toward the rear of the machine, and forwardly located wheels 12.

Figures 1, 2, 16, 17:
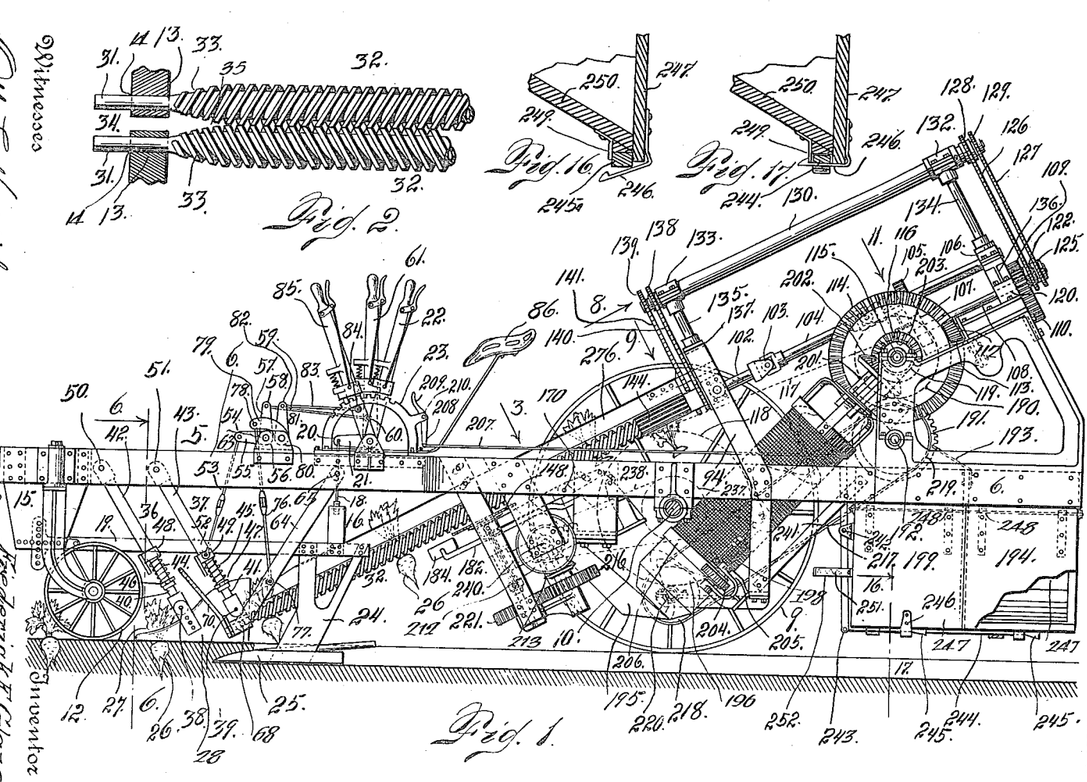
Figure 1 is a side elevation of my improved beet harvester.
Fig. 2 is an underneath view of the forward extremities of the coöperating worms shown on a larger scale.
Figs. 16 and 17 are sections taken on the line 16—17, Fig. 1, the parts being shown on a larger scale.
Figures 5, 6, 7:
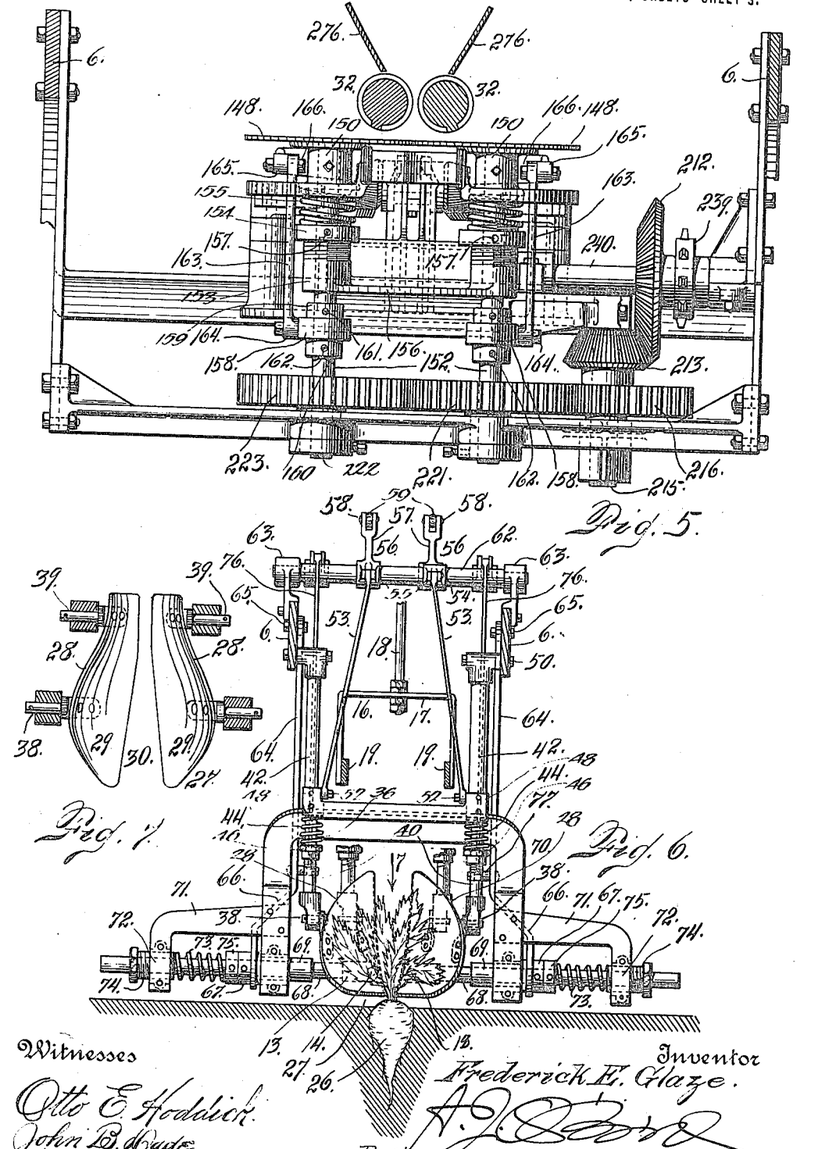
Fig. 5 is a view looking in the direction of arrow 5, Fig. 3.
Fig. 6 is a section taken on the line 6—6, Fig. 1, looking rearwardly or toward the right.
Fig. 7 is a detail view of the top gathering devices or a view looking in the direction of arrow 7, Fig. 6, the supports for these devices being shown in horizontal section.

Supported on the forward part of the main framework are two horizontally disposed parallel and suitably spaced bars 19 whose forward extremities are connected with the forward ends of the main frame bars 6 by means of depending members 16; while the rear extremities of the bars 19 are supported by an inverted U-shaped member 16 to the center of whose top 17 is connected a rod 18, whose upper extremity is pivotally connected as shown at 20 (see Fig. 1), with a crank arm 21 connected in operative relation with a hand lever 22 which coöperates with a quadrant 23. To the rear extremities of the bars 19 are secured depending members 24 to whose lower extremities are attached the plows or uprooting devices 25 which are arranged on opposite sides of the row of beets 26 and which are adapted to uproot the same in the usual manner. It is evident that by manipulating the lever 22, the rear portions of the bars 19 together with the plows or uprooting devices 25, may be adjusted vertically. Just forward of the plows I mount a top-gathering device 27. This device consists of two members 28 which are relatively wide in front as shown at 29. They are also spaced in front as shown at 30, this space gradually diminishing in width toward the rear. These members are relatively low in front (see Fig. 1) and are adapted to run close to the ground and pass under the foliage or tops of the beets. They extend upwardly toward the rear, whereby the tops are lifted above the upper part of the body of the beet, thus giving the plows an opportunity to perform their function. The gradual increase in height of the top-gathering members is best illustrated in Fig. 1. They are supported in operative relation with the framework by means of depending bars 36 and 37. There are two pairs of these bars, each pair consisting of a bar 36 and 37 and the lower extremities of the two members of each pair are connected with one of the gathering devices 28 as shown at 38 and 39. The lower portions 40 and 41 of these bars telescope in the upper portions 42 and 43 and spiral springs 44 and 45 are located between shoulders 46 and 47 below, and stops 48 and 49 above. By virtue of this construction and arrangement, the gathering devices 28 are adapted to vibrate vertically to compensate for unevennesses or variations in the surface over which the machine is traveling when in use. The upper extremities of the supporting members 37 and 38 of each pair are pivotally connected as shown at 50 and 51. The rearwardly located bar 37 of each pair is connected as shown at 52 with a depending rod 53 which is pivotally connected at its upper extremity as shown at 54 to one arm 55 of a bell crank lever 56, whose opposite arm 57 is pivotally connected as shown at 58 with the forward extremity of a rod 59, the rear extremity of said rod being connected as shown at 60, with a hand-operated lever 61. By means of this lever and these connections, these gathering devices may be raised and lowered at will. Attention is called to the fact (see Fig. 6) that there are two bell crank levers 52 and two depending rods 53, one for each of the gathering members 28. These levers 56 are independently journaled upon a shaft 62 whose extremities are supported in bearings 63 mounted on the main side bars 6 of the machine.

The top-gathering members 28 are arranged in coöperative relation with the lower and forward extremities 31 of two relatively long worms or screws 32. The forward extremities 31 of these worm shafts or screw shafts are plain or unthreaded and spaced to allow the beet tops to pass between them. Furthermore, the forward portions of these worms in the rear of the unthreaded parts 31 are approximately cone-shaped as shown at 33, whereby the spacing 34 between the forward extremities of the worms gradually diminish in width toward the rear, until a point 35 is reached (see Fig. 2), where the threads of the two worms are in close proximity. From an inspection of the drawing it will be understood that as the gatherers 28 are acting on the tops of the beets and approximately at the time the beet tops pass between the forward extremities of the worms, the beet bodies are uprooted by the plows or diggers 25.

These worms or screws 32 are upwardly inclined toward the rear, their forward extremities being lowermost and arranged close to the ground, in order to allow the beet tops at the time the beets are uprooted to pass into direct engagement with the threads or spirally arranged members of the worms. The forward extremities of the worms 32 are journaled as shown at 14, in bearings 13 formed on the inner extremities of spindles 68. These worms are adjustably supported at their forward extremities by means of links 64 which are pivotally connected at their upper extremities as shown at 65, with the side bars 6 of the frame, while their lower extremities which are bent outwardly for the purpose as shown at 66, extend downwardly and are respectively connected as shown at 67, with spindles 68 which are horizontally disposed and slidable in bearings 69 which are carried by the lower extremities of a yoke 70 to which are secured laterally projecting angle members 71 having depending outer extremities 72 spaced from the bearings 69 of the yoke. The spindles 68 also pass through the extremities 72 of the yoke angle members 71. The spindles 68 between the bearings 69 and 72 are surrounded by spiral springs 73 which engage the inner extremities of tension nuts 74 at one end and adjustable collars 75 at their opposite ends. These spindles are also horizontally slidable in the lower extremities 67 of the links 64. The collars 75 are fast on the spindles and the latter are adapted to slide longitudinally in their bearings to permit lateral spread of the lower extremities of the worms. Furthermore, through the medium of the links 64 the forward extremities of the worms may be manipulated vertically by the employment of depending rods 76 whose lower extremities are pivotally connected with the links as shown at 77 and whose upper extremities are connected as shown at 78 with the forward arm 79 of a bell crank lever 80 whose opposite arm 81 is connected as shown at 82 to the forward extremity of a rod 83 whose rear extremity is connected as shown at 84, with a hand lever 85.

These various levers 22, 61 and 85 are conveniently accessible to the person in charge of the machine, as they are arranged just in front of a seat 86 upon which the operator sits.

These worms extend upwardly and rearwardly from their forward bearings, their rear extremities being journaled in bearings 87 (see Fig. 8) formed on the inner extremities of spindles 88 which are horizontally disposed and slidable longitudinally in bearings 89 carried by hangers 90 which are supported at their upper extremities on a transverse member 91 secured by fastening devices 92. These hangers 90 are further supported by means of braces 93 whose lower extremities are secured to upwardly projecting bars 94 as shown at 95, the lower ends of the bars 94 being made fast to the main side bars 6 as shown at 96. The upper extremities of the bars 94 are connected as shown at 97 with the outer extremities of the top cross bar 91. The spindles 88 extend beyond their bearings 89 and also extend through bearings 98 which are mounted on the bars 94. Tension nuts 99 are threaded in the bearings 98 and are adapted to engage the outer extremities of spiral springs 100 which are mounted on the spindles between the tension nuts and stop collars 101 which engage the outer extremities of the bearings 89. By virtue of this construction and arrangement, the upper extremities of the worms are yieldably held in operative engagement with each other and are therefore adapted to yield laterally as occasion may require. The upper and rear extremities 102 of these worms are unthreaded and connected by means of universal joints 103 with rearwardly extending shafts 104 which are equipped with meshing gears 105. The rear extremities of the shafts 104 are journaled in bearings 106 supported upon the rear extremity of the framework of the machine. One of the gears 105 is in meshing relation with a lower gear 107 fast on a shaft 108 whose rear extremity is equipped with a gear 109 which is arranged in meshing relation with a gear 110 fast on a shaft 112 whose forward extremity is equipped with a beveled pinion 113 meshing with a relatively large gear 114 fast on a horizontally disposed transverse shaft 115 whose opposite extremities are journaled as shown at 116 in the framework of the machine on opposite sides. The power for operating the worms is transmitted from the shaft 115, which is in turn operated from the main axle 10 of the machine by means of a sprocket chain 117 which connects a relatively large sprocket 118 fast on the axle 10, with a small sprocket 119 fast on the shaft 115.

Figures 8, 10:
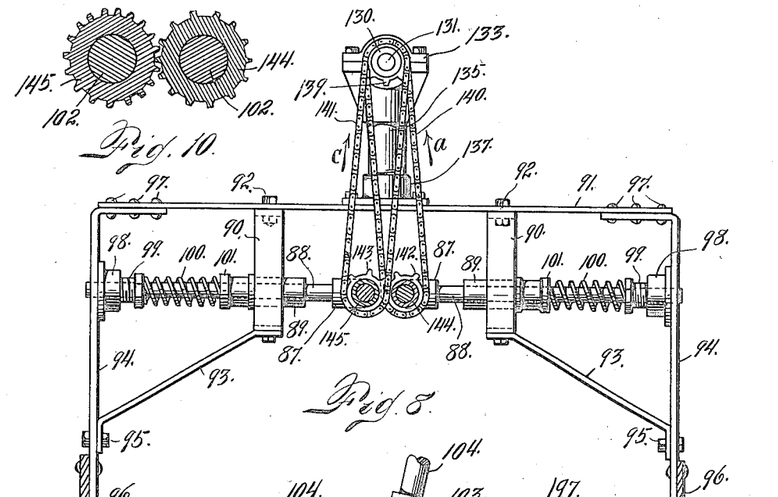
Fig. 8 is a fragmentary view looking in the direction of arrow 8, Fig. 1, the worm shafts being shown in section.
Fig. 10 is a section taken on the line 10—10, Fig. 9, the parts being shown on a larger scale.
Figure 9:
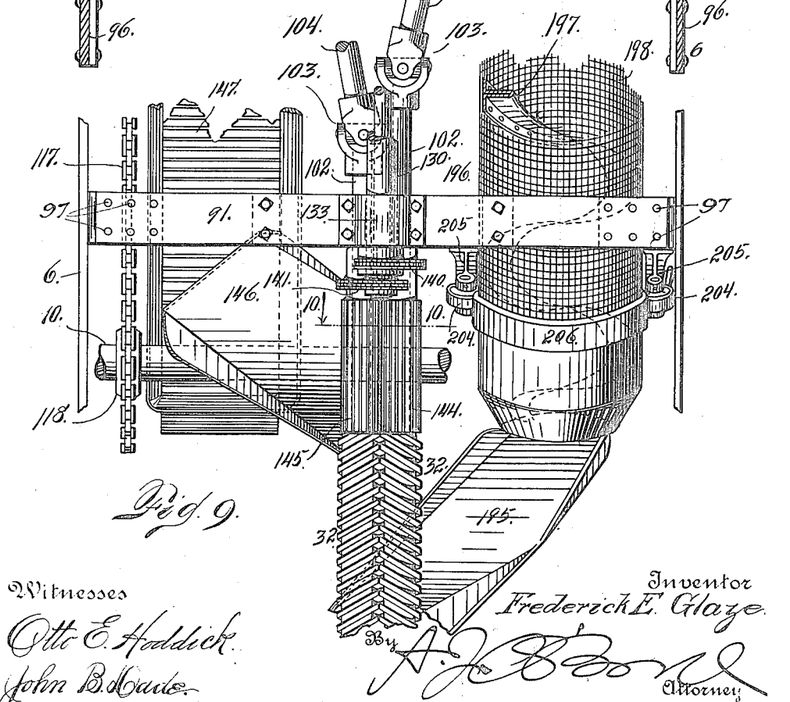
Fig. 9 is a fragmentary top plan view looking in the direction of arrow 9, Fig. 1, the parts being shown on a larger scale.
Figure 11:
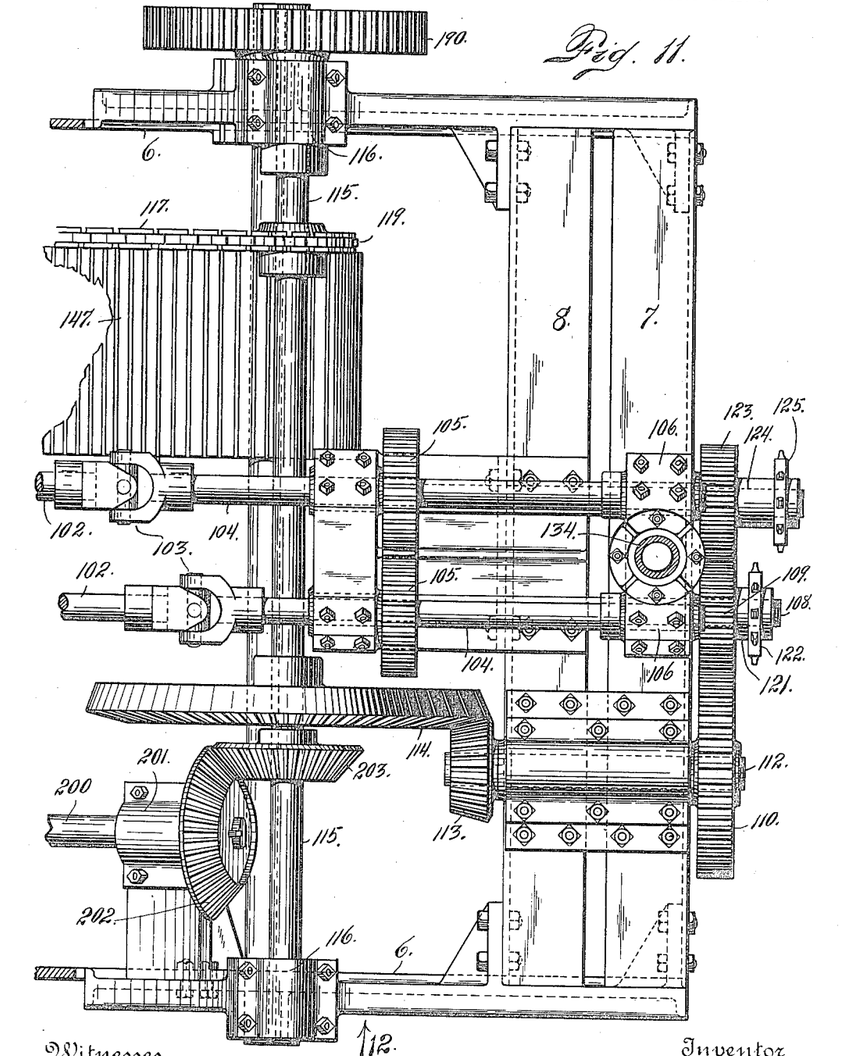
Fig. 11 is a fragmentary view of the rear portion of the machine, looking in the direction of arrow 11, Fig. 1, the parts being shown on a much larger scale.
Figure 12:
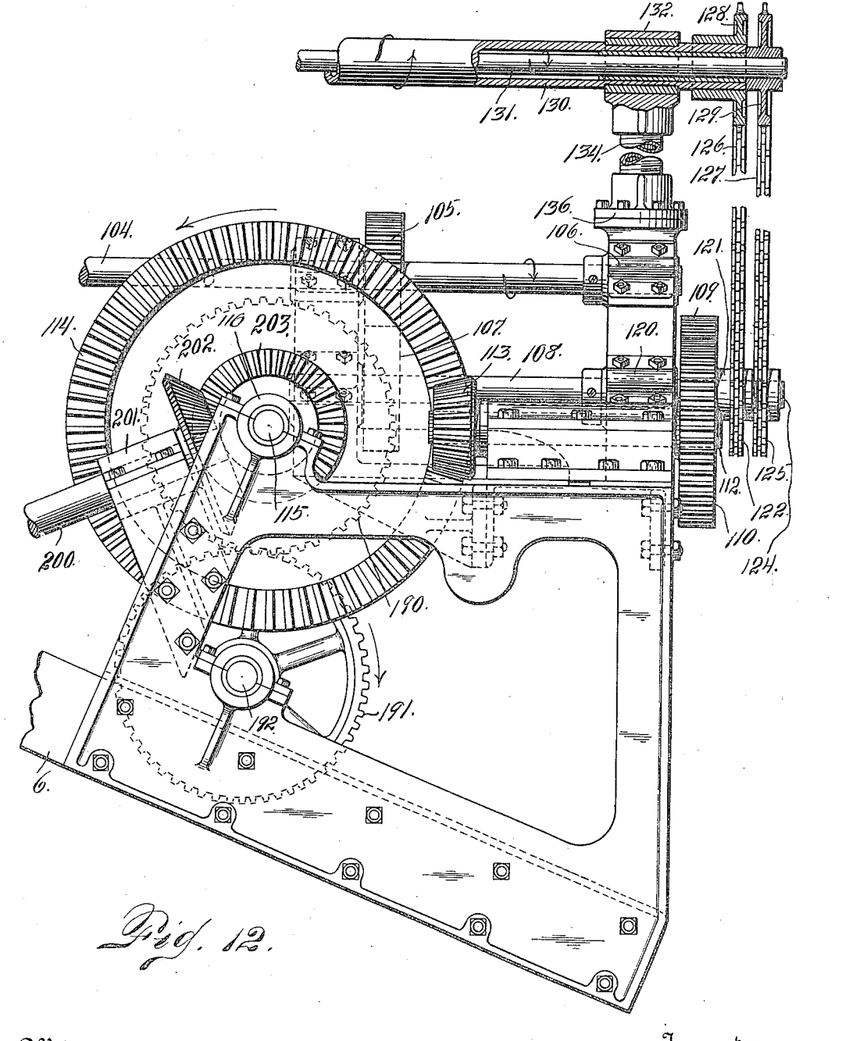
Fig. 12 is a fragmentary side elevation, partly in section, looking in the direction of arrow 12, Fig. 11.

The shaft 108 is journaled in a box 120 supported on the rear extremity of the framework. The shaft, however, extends beyond its bearing in a rearward direction. In fact, the gear 109 is located rearwardly of the bearing 120. This shaft also extends beyond the gear 109 as shown at 121 and is equipped with a sprocket wheel 122. Furthermore, the gear 109 meshes with a gear 123 fast on a short shaft 124, journaled in the rear part of the framework. Upon this shaft and located in the rear of the gear 123 is a sprocket wheel 125. The two sprockets 122 and 125 are respectively connected by means of chains 126 and 127, with sprockets 128 and 129, respectively made fast to shafts 130 and 131. These two shafts are coaxially mounted, that is to say, the shaft 121 passes longitudinally through the shaft 130 which is hollow for the purpose, the two shafts rotating in reverse directions. The hollow shaft 130 is journaled at its opposite extremities in bearings 132 and 133, said bearings being respectively supported by vertically disposed rear and front columns 134 and 135. The lower extremity of the rear column 134 is supported upon the rear built-up part of the framework as shown at 136, while the lower extremity of the column 135 is supported as shown at 137 on the top transverse member 91 of the framework, as heretofore described and as best illustrated in Fig. 8. The forward extremities of the two shafts 130 and 131 are respectively equipped with sprocket wheels 138 and 139, which sprocket wheels are respectively connected through the medium of chains 140 and 141 with similar sprockets 142 and 143 made fast upon the rear extremities of toothed sleeves 144 and 145 which are journaled on the upper portions of the worms 32 and are arranged to turn in opposite directions by virtue of the gearing connections heretofore described. For instance, the chain 140 (see Fig. 8) is traveling in the direction indicated by the arrow $a$ while the chain 141 is traveling in the direction indicated by the arrow $c$. By virtue of this arrangement, the relatively short toothed sleeves 144 and 145 are rotating inwardly toward each other at the top, as also indicated by the arrows in Fig. 9 and by virtue of this construction and arrangement, the beet tops, after they have been carried upwardly by the worms 32, will be carried downwardly and discharged into a chute 146, whence they pass to an elevator 147, as hereinafter more fully described.

Forwardly located from the toothed sleeves 144 and 145 are the rotary knives or cutters 148 which consist of disks whose peripheries are toothed as shown at 149 and are arranged to coöperate with each other for removing the beet tops. These disks (see Figs. 1, 3 and 4) are secured to hubs 150 which in turn are made fast by means of set bolts 151 to the upper extremities of vertically disposed shafts 152. Each of the shafts 152 is freely slidable in a bearing 153 which is exteriorly threaded to receive a stop nut 154 which is engaged by the lower extremity of a spiral spring 155 surrounding the said bearing and also engaging the lower extremity of the hub 150 of the knife or cutter. By virtue of this arrangement, it will be understood that each of the rotary knives is spring supported in a predetermined position. The two bearings 153 are rigidly connected by a horizontally disposed web 156. Each stop nut 154 when properly adjusted, is locked in the adjusted position by means of a set screw 157. Below the bearing 153, each shaft is provided with a collar 158 which is maintained at a predetermined position or height upon the shaft by upper and lower collars 159 and 160, these collars being secured to the shaft by set screws 161 and 162. With each collar 158 is pivotally connected the lower extremity of a link 163 by means of a set bolt or screw pin 164, the upper extremity of each link being pivotally connected by a bolt 166 with the forward extremity of an arm 165. The two arms 165 merge into transverse members 167 which unite at 168 in a lever arm 169, which is fulcrumed as shown at 170. The rear extremity of this lever arm is bifurcated as shown at 171 and its parts 172 engage on opposite sides the outer extremity of a link 173 whose opposite extremity is connected as shown at 274 with a crank 275 of a shaft 174, which is journaled in bearings 175 mounted upon the stationary framework of the machine. The fulcrum 170 for the lever arm 169 is mounted in bearings 176 also supported upon the stationary framework. The opposite extremities of the crank shaft 174 are equipped with beveled pinions 177 which mesh with segmental gears 178 which are pivoted at 179 to oscillate horizontally. Each of these gears is equipped with a bracket 180 to which is secured as shown at 181, the rear extremity of an arm 182, whose forward extremity is curved inwardly as shown at 183 and merges into a shoe 184 which extends both forwardly and rearwardly from the part 183 of the arm. Near the rear extremity of each of these arms 182 is located an inwardly projecting hook or eyebolt 185 with which one extremity of a spiral spring 186 is connected, the opposite extremity of the spring being connected as shown at 187 with a hook 188 which is secured to a stationary part of the framework below the fulcrum 170 of the lever or lever arm 169. By virtue of this construction, the inner extremities of the two springs 186 are securely anchored to the frame of the machine.

The two shoes 184 which are connected with the forward extremities of the arms 182 as heretofore explained, are normally separated or spaced as shown at 189 and arranged below the worms 32 to receive the bodies 26 of the beets. The spacing of these shoes is normally such as to receive a small or medium size beet and the elevation of the knives or rotary cutters 148 is such as to top a beet of this character in the proper place or plane. If the beets are larger, they should be topped lower and beets of this character will be so large that they will press the shoes 184 farther apart and during this operation, these arms, by virtue of their connection with the segmental gears 178, will actuate the pinions 177 to impart a partial rotary movement to the crank shaft 174, whereby the lever arm 169 will be actuated to lower the forked arms 165, thus imparting through the medium of the links 163, a downward movement to the knife-carrying shafts 152, whereby the knives are sufficiently lowered to top the beet in the proper plane. Shortly after the top is removed, it passes into engagement with the toothed rollers or sleeves 144, which by virtue of their rotary action in directions the reverse of the worms upon whose shafts they are mounted, serve to carry the beet tops downwardly and cause them to enter the chute 146, whereby they are carried to the top elevator 147, as heretofore explained. This elevator is operated from the shaft 115 which is provided with a gear 190 located at one extremity of the said shaft and meshing with a similar gear 191 fast on a shaft 192. Upon this shaft is mounted a sprocket wheel 219 which is connected by means of a chain 217, with a sprocket 218, fast on a shaft 220. In this way, motion is imparted to the elevator or carrier 147 to carry the beet tops or foliage upwardly and discharge them upon a chute 193, from which they pass into a receptacle 194.

The manner of transmitting motion to the rotary cutters will now be described. From a sprocket wheel 237 fast on the axle 10, leads a sprocket chain 238 to a sprocket 239 fast on a horizontal shaft 240 journaled in the framework. Upon this shaft is also mounted and made fast a beveled gear 212 which meshes with a smaller gear 213 fast on a vertically disposed shaft 215. Below the gear or pinion 213 on the shaft 215 is located and made fast a gear 216 which meshes with a gear 221 splined on the lower portion 222 of one of the shafts 152. This gear 221 meshes with a similar gear 223 fast on the other shaft 152, the two shafts 152 carrying the rotary cutters 148, as heretofore explained.

As soon as the beet tops have been severed from the bodies of the beets, the latter drop into a chute 195 which is downwardly inclined and discharges the beets into the lower extremity of a cylindrical rotary separator 196 which is upwardly inclined from the extremity communicating with the chute 195. This separator 196 is provided intermediate its extremities with a mesh wall 198 to allow the dirt which is separated from the beets during their upward travel, to escape. The interior of this separator is provided with a spiral flange 197 which carries the beets upwardly during the rotation of the separator. The beets are discharged from the upper extremity of the rotary separator, into a receptacle 199.

The upper extremity of this separator is equipped with a trunnion or stub shaft 200, which is journaled in a bearing 201 mounted on the framework (see Fig. 1). The upper extremity of this shaft is equipped with a beveled gear 202 which meshes with a similar gear 203 fast on the shaft 115 which imparts the rotary movement to this separator. The forward portion of the separator is supported and maintained in proper operative relation with the other parts of the mechanism by track wheels or disks 204, which are journaled in brackets 205 mounted on the framework. These disks or wheels 204 engage a circular track or band 206 with which the lower portion of the rotary separator is equipped just below the lower extremity of its screen portion 198.

From the foregoing description, the use and operation of my improved beet harvester will be readily understood. The machine may be moved across the field by means of draft animals or in any other suitable manner. The machine as illustrated is intended for use in handling a single row of beets at a time. The frame-supporting wheel members of each pair of wheels 9 and 12 are arranged on opposite sides of the row of beets to be harvested.

As the machine proceeds, the top or foliage gathering devices 28 serve to lift the beet tops or foliage from the ground and raise them upwardly into position to deliver them to the elevating worms or screw shafts 32. At the same time, the plows 25 serve to uproot the beets. The latter, together with the tops, are then carried upwardly by the worms. Just before the beet reaches the rotary knives 148 it passes between the shoes 184, and if it is a relatively large beet, these shoes will be pressed farther apart and this action will automatically serve to depress or lower the knives or cutters 148, whereby the beet top is removed in a relatively low plane, that is to say, in a lower plane than would be the case were the beet relatively small. The beet bodies then drop downwardly into the chute 195 and pass thence to the lower extremity of the rotary separator 196, through the medium of which they are subjected to considerable agitation, whereby the dirt which may be still clinging to them when they reach the separator, is removed and caused to pass through the mesh wall 198 of this separator. The spiral flange 197 of the separator causes the beets to travel upwardly therein, and as soon as they reach the upper extremity of the separator, they are discharged into a receptacle 199, from which they may be discharged at suitable intervals through the medium of an operating rod 207, whose forward extremity is connected as shown at 208 with a foot lever 209, which is easily accessible to the operator of the machine, occupying the seat 86.

After the tops are removed from the beets, the tops are carried upwardly by the worms 32 and delivered to the toothed or longitudinally ribbed rollers 144 which operate to roll the tops downwardly and discharge them into the chute 146, whence they pass to the top or foliage elevator 147 which carries them upwardly and discharges them through the medium of the chute 193, into the receptacle 194, from which they may be discharged at intervals through the medium of the rod 207 and lever 208, as heretofore explained when describing the manner of discharging the beets from the receptacle 199.

This foot lever 209 is fulcrumed as shown at 210 on the quadrant 23.

The manner of imparting movement to the various features or mechanisms of the apparatus having heretofore been described in detail, need not be given further consideration. It must be also understood that the invention is not limited to the details of construction herein set forth. In other words, it is evident that many modifications may be employed without going beyond the scope of the appended claims.

Figures 13, 14, 15:
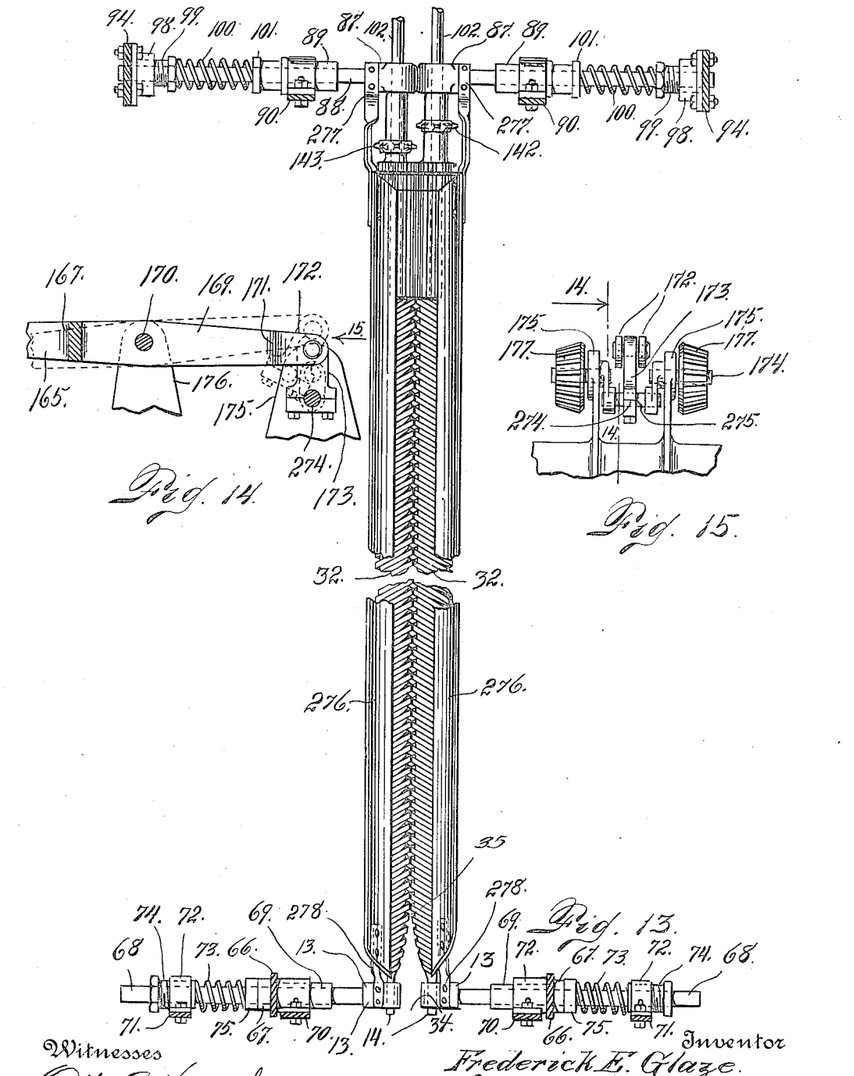
Fig. 13 is a top plan view of the coöperating elevator worms, and their direct connections shown in detail.
Fig. 14 is a detail view partly in sectional elevation illustrating the rear part of the lever constituting an element of the construction.
Fig. 15 is an end view of the same structure, looking in the direction of arrow 15, Fig. 14.

In order to prevent the beet tops during their upward movement when actuated by the elevator worms, from bending downwardly and interfering with the operation of the worms, I have arranged longitudinally disposed plates 276 (see Fig. 13) above the worms, but in close proximity thereto, the said plates overlapping portions of the worms, but leaving the longitudinal portions of the latter exposed sufficiently to allow them to perform their elevating function. These plates 276 are secured at their forward extremities, as shown at 278, to the bearings 13, in which the corresponding extremities of the worms are journaled; and at their rear extremities to the bearings 87, as shown at 277. Attention is called to the fact that the elevator worms are multiple-threaded in order to cause them to impart rapid travel to the beets in the performance of their function. In the specific construction shown in the drawing, each worm is provided with four distinct threads.

The rear extremity of the rod 207 is connected with the upper extremity of a lever 241 fulcrumed at 242 and whose lower extremity is connected as shown at 243 with a bar 244 carrying wedge-shaped members 245 arranged to act on spring latches 246 which normally serve to hold doors 247 of the receptacles 194 and 199, in the locked position. These doors are hinged at their upper extremities as shown at 248. When the lever 208 is actuated to move the rod 207 rearwardly, the lever 241 is actuated to shift the wedge bar 244 sufficiently to cause its wedge members to act upon the spring latches 246, to disengage them from their engaging parts 249. As soon as this occurs, the pressure of the beets and tops upon the doors 247 by virtue of the inclination of the bottoms 250 of the receptacles, will cause the doors to open and allow the beets and tops to be discharged. As soon as the actuating pressure is released from the lever 208, a spiral spring 251 will act to return the parts to their normal position. This spring is connected with the lever 241 below its fulcrum and is placed under compression when the lever is actuated to allow the doors 247 to open. One extremity of the spring acts upon the lever while its opposite extremity engages the outer end of a metal loop or casing 252.

Figure 3:
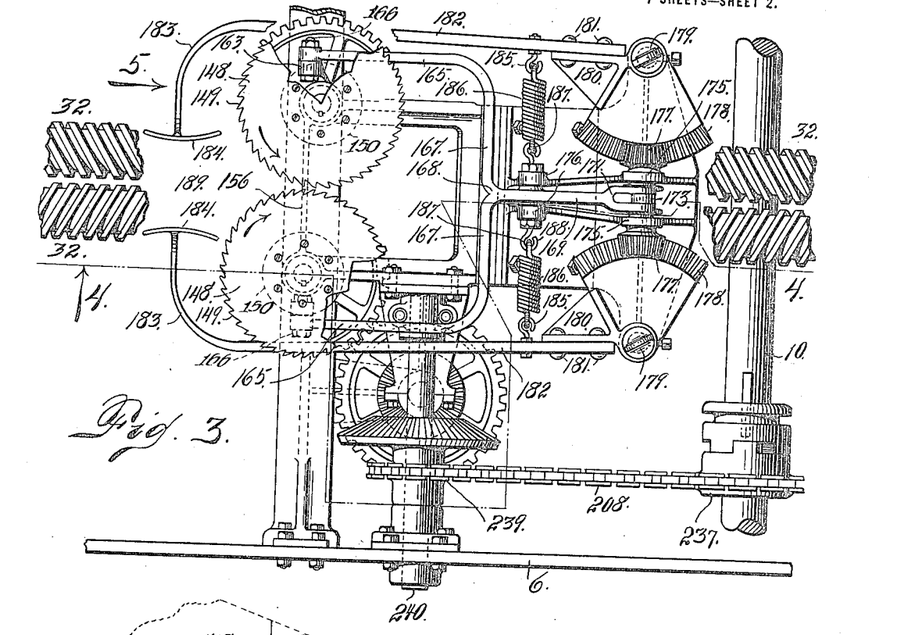
Fig. 3 is a fragmentary top plan view looking in the direction of arrow 3, Fig. 1, the parts being shown on a still larger scale.
Figure 4:
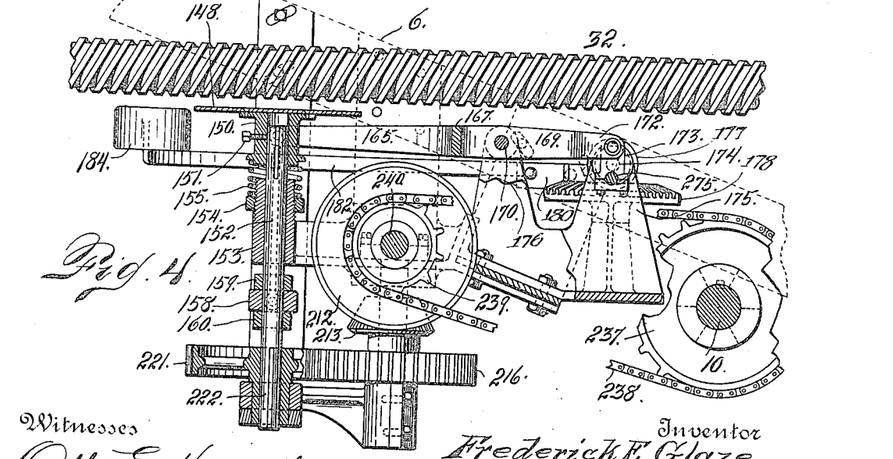
Fig. 4 is a section taken on the irregular line 4—4, Fig. 3, viewed in the direction of the arrow.

Attention is called to the fact that the topping knives, cutters or rotary saws 148 have their axes offset slightly longitudinally of the machine from each other. In other words, the axes of their vertically disposed shafts 152 are not in the same vertical plane extending at right angles to the direction of travel when the machine is in use. Referring to Fig. 3 of the drawing, it will be noted that the right-hand cutter or that on the right-hand side from a position in the rear of the machine, has its axis slightly in the rear of its companion cutter. By reason of this fact, the axes of the two cutters may be brought nearer together without causing their teeth 149 to come into actual contact. Furthermore, by reason of this provision, it is practicable to completely sever the top or neck from the body of the beet or cut entirely through the same without the actual contact of the teeth of the two cutters. Actual engagement of the teeth is impracticable for the reason that they would soon wear off, leaving a space between them and consequently, the beet tops would not be completely severed.

In order that the mechanism for automatically regulating the plane of cut of the topping knives may successfully perform its function, it is not necessary that the beet shall engage both of the shoes 184 of the lever arms 182. It sometimes happens that a beet is not perfectly symmetrical. In other words, in many instances, the beet projects farther from the top on one side than on the opposite side. A beet of this character, since its top is in engagement with the worms 32, may project far enough to engage one of the shoes 184 and not engage the other. This pressure upon one shoe will operate the automatic mechanism for lowering the topping knives in the same manner as if both shoes were engaged by the beet, as will be readily understood from an inspection of the drawing illustrating the mechanism heretofore described.

Having thus described my invention, what I claim is:—

1. A beet harvester including an elevator composed of two worms extending upwardly from front to rear and coöperating to elevate the beets upwardly and rearwardly.

2. A beet harvester including an elevator composed of two worms extending upwardly from front to rear and coöperating to elevate the beets and carry them rearwardly by acting on the tops, the bodies of the beets maintaining a position below the worms.

3. A beet harvester including an elevator composed of two worms extending upwardly from front to rear and having oppositely arranged spirals for causing the beets to move upwardly and rearwardly.

4. A beet harvester including an elevator composed of two worms extending upwardly from front to rear and having oppositely arranged threads, and means for rotating the worms in opposite directions to cause the beets to be carried upwardly and rearwardly.

5. A beet harvester including an elevator composed of two worms extending upwardly from front to rear and having oppositely arranged threads, and means for rotating the worms in opposite directions and so that their lower portions during rotation shall approach and their upper portions move away from each other whereby the beets will be raised upwardly and carried rearwardly.

6. A beet harvester including an elevator composed of two worms extending upwardly from front to rear and having oppositely arranged spirals, means for rotating the worms in opposite directions and so that their lower portions during rotation shall approach and their upper portions move away from each other, and rollers respectively coaxially mounted with the worms at the upper extremities of the latter for discharging the tops which have been elevated to them by the worms.

7. A beet harvester including an elevator composed of two worms extending upwardly from front to rear and having oppositely arranged spirals, means for rotating the worms in opposite directions and so that their lower portions during rotation shall approach and their upper portions move away from each other, rollers respectively coaxially mounted with the worms at the upper extremities of the latter, and means for rotating the said rollers in directions respectively opposite from their corresponding worms.

8. A beet harvester including an elevator comprising two worms having oppositely arranged threads, means for rotating the worms in opposite directions, rollers journaled on the upper portions of the worm shafts, which are unthreaded for the purpose, and means for rotating the said rollers respectively in opposite directions from their corresponding worms.

9. A beet harvester including an elevator composed of two worms extending upwardly from front to rear and coöperating to elevate the beets and carry them rearwardly, each of said worms having a plurality of spirally arranged members.

10. A beet harvester including an elevator composed of two multiple threaded worms extending upwardly and rearwardly and coöperating to elevate the beets and carry them rearwardly, the threads of one worm being oppositely arranged from the threads of the other worm.

11. A beet harvester including an elevator composed of two multiple threaded worms, the threads of one worm being oppositely arranged from the threads of the other worm, and means for rotating the worms in opposite directions to cause them to raise the beets and carry them rearwardly.

In testimony whereof I affix my signature in presence of two witnesses.

FREDERICK E. GLAZE.

Witnesses:
 MAZE KIRBY,
 A. EBERT O'BRIEN.